US006895065B1

(12) United States Patent
Lebrun et al.

(10) Patent No.: US 6,895,065 B1
(45) Date of Patent: May 17, 2005

(54) METHOD AND APPARATUS FOR IDENTIFYING NUCLEAR FUELS

(75) Inventors: Alain Lebrun, Jouques (FR); Gilles Bignan, Meyrargues (FR); Sylvain Vaubaillon, Paris (FR)

(73) Assignees: Commissariat a l'Energie Atomique, Paris (FR); Compagnie Generale des Matieres Nucleaires, Velizy-Villacoublay (FR)

( * ) Notice: Subject to any disclaimer, the term of this patent is extended or adjusted under 35 U.S.C. 154(b) by 0 days.

(21) Appl. No.: 09/869,635

(22) PCT Filed: Jan. 19, 2000

(86) PCT No.: PCT/FR00/00108

§ 371 (c)(1),
(2), (4) Date: Jul. 2, 2001

(87) PCT Pub. No.: WO00/44002

PCT Pub. Date: Jul. 27, 2000

(30) Foreign Application Priority Data

Jan. 20, 1999 (FR) .......................................... 99 00575

(51) Int. Cl.$^7$ ............................................. G21C 17/00
(52) U.S. Cl. ........................ 376/257; 376/159; 376/245
(58) Field of Search .................................. 376/257, 159

(56) References Cited

U.S. PATENT DOCUMENTS

| 3,717,765 A | * | 2/1973 | Hiller ..................... 250/370.03 |
| 3,728,544 A | | 4/1973 | Untermyer |
| 3,796,876 A | * | 3/1974 | Krinninger et al. ......... 250/363 |
| 4,291,227 A | | 9/1981 | Caldwell et al. |
| 4,335,466 A | * | 6/1982 | Lee ............................ 376/257 |
| 4,510,117 A | * | 4/1985 | Phillips et al. ............... 376/254 |
| 4,617,167 A | * | 10/1986 | Kruse et al. ................. 250/374 |
| 4,629,600 A | * | 12/1986 | Ishiguro et al. ............. 376/157 |
| 4,881,247 A | * | 11/1989 | Smith et al. ................. 376/257 |
| 6,035,010 A | * | 3/2000 | George et al. .............. 376/257 |

FOREIGN PATENT DOCUMENTS

| EP | 0 280 925 A | 9/1988 |
| GB | 1197099 | * 7/1970 |

OTHER PUBLICATIONS

W. Michaelis, "Non–destructive analysis of nuclear fuels by radiative neutron capture," Atomkernenergie 14, Jg. (1969).*
Phillips et al. "Quantitative Determination of Fission Products in Irradiated Fuel Pins Using Nondestructive Gamma Scanning," Analytical Chemistry, vol. 47, No. 1, Jan. 1975.*
XP–002116115; Derwent Publications Ltd.; Oct. 1982.

* cited by examiner

Primary Examiner—Michael J. Carone
Assistant Examiner—Rick Palabrica
(74) Attorney, Agent, or Firm—Pearne & Gordon LLP

(57) ABSTRACT

The device comprises a detector (15) of radiation that could be neutron radiation and a detector (16) of another type of radiation, for example gamma radiation. The process consists in deducing a burn up fraction or irradiation of the nuclear fuel (26) by the measurement of the measured value of a radiation, while assuming that the fuel has a defined composition. One deduces from this the activity of the other radiation that one should obtain, and the accuracy of the assumption of the composition of the fuel if the measured value is close to this deduced value. The device (1), which makes it possible to obtain satisfactory measurements in a water filled storage bay (26), is fitted with means for attaching it to a boom (3) and for positioning it (6, 9) in a given position on a fuel storage cell structure (4). The device is displaced towards each fuel element.

7 Claims, 4 Drawing Sheets

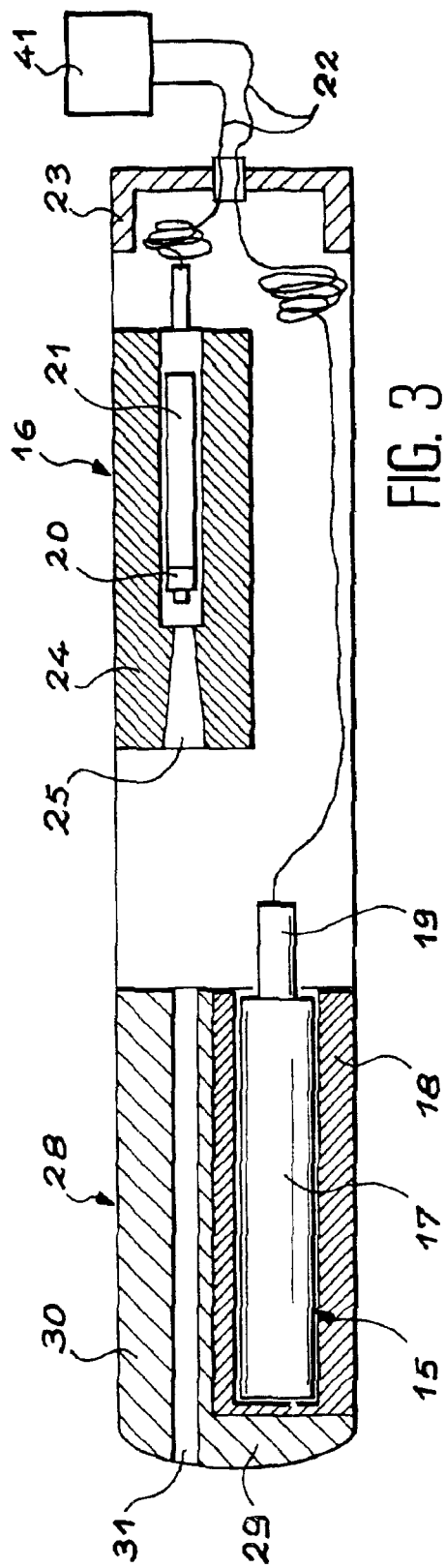
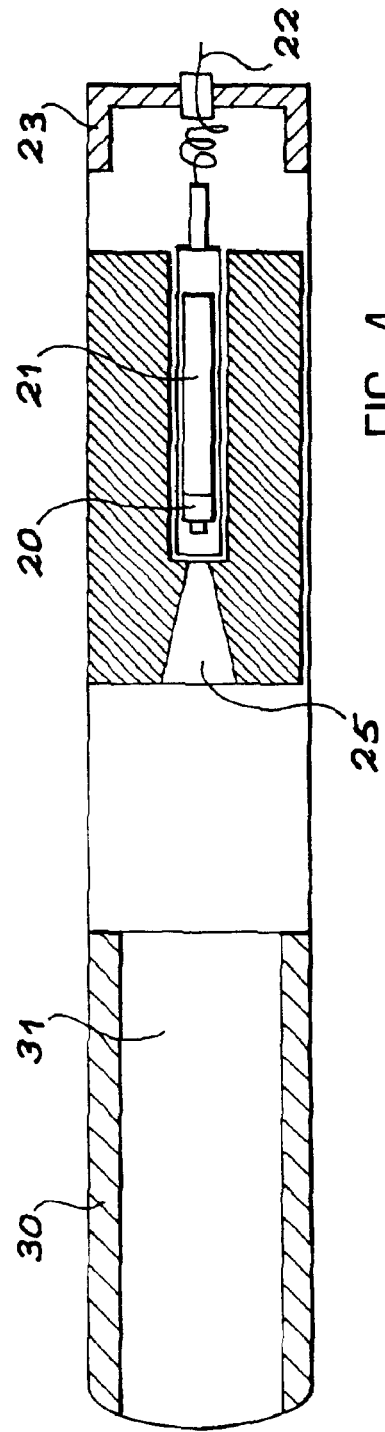
FIG. 3
FIG. 4

METHOD AND APPARATUS FOR IDENTIFYING NUCLEAR FUELS

DESCRIPTION

The invention concerns a process and a device for discriminating nuclear fuels from their initial composition, before they have been modified by burn-up.

Nuclear fuels normally contain uranium oxide as the fissile element. Another fuel, containing a mixture of uranium oxide and plutonium oxide, is however being more widely used. Devices are therefore needed to tell if a fuel element in a nuclear reactor contains a fuel of one or the other type. In order to do this, one can exploit the differences in the radiation that these fuels emit, but the difficulties that need to be overcome do not allow, at first sight, a certain diagnosis to be established.

Fuel only containing uranium oxide does not emit neutrons in the new or non-irradiated state, unlike fuel containing plutonium oxide. It therefore appears simple to discriminate between these two types of fuels using this criterion, but this becomes impossible with irradiated fuels, which all emit neutrons. Gamma radiation, also emitted by nuclear fuels, also does not enable them to be discriminated since its intensity is identical for both of the fuel compositions considered here, but it also depends very much on the irradiation of the fuel, and even the cooling time, when the fuel has been extracted from the reactor in order to be examined.

A device fitted with gamma and neutron radiation detectors exists, but it is not normally intended to discriminate between fuels. The radiation measurements are independent and are used to evaluate the level of radiation or the burn-up fraction of the fuel in order to verify that it is not used up. The total gamma radiation is measured so that its drop off as a function of the cooling time can be used, and the level of burn-up is deduced from the form of the decreasing function.

If the composition of the fuel is not known accurately, the inventors of this prior device propose an "active" neutron method instead of measuring the neutron radiation emitted by the fuel: this method consists in having a source of neutrons beside the fuel and measuring the emission of neutrons that passes through the fuel; the device is divided into two parts on either side of the fuel, one of which holds the neutron source and the other the detector. The device therefore becomes bulky and not-transportable in practice; it therefore remains immobile and each fuel element is placed before it. This makes it necessary to extract each element (in general, a cluster of very long rods) from the cell in which it is stored, and to pass it in front of the device, before replacing it in its place. These lengthy manipulations make the measurement procedures fastidious, increase the inactivity time of the reactor and risk deteriorating the elements. One cannot accept working in this manner to discriminate between fuel elements, especially when substitutions with criminal intent are feared, in particular to steal plutonium, and where the person making the substitution can be very skilful and wish to hide his/her act by replacing the fuel by another with quite similar emission properties, or simply several rods of the assembly. The measurements must be precise and carried out with care, which makes it necessary to take the time to ensure they are made under correct operating conditions or to take additional measures by precaution. One thus wishes to avoid lengthy handling of the fuel elements and to merely extract them partially from their cells, by transporting the device in front of each element.

It should be pointed out that the active neutron method is insensitive to the composition of the fuel, but that it does not provide information on this composition and that it replaces the method of measuring neutrons emitted by giving the same result.

Therefore it would be a good idea to meet the requirement for quite quick measurements for discriminating between fuels using a mobile device, and it should not be forgotten that the device and the fuel remain immersed and that it is therefore difficult to ensure the precise position of the device. A solution is proposed with the device that is the subject of the invention.

The proposed process differs from that of the prior device in that it is based on the correlation between two radiation measurements in order to obtain another result. It involves a process for discriminating nuclear fuels from their compositions, whereby it consists in measuring two types of radiation emitted by the fuel, deducing a burn up level of the fuel from the measured value of one of the types of radiation, assuming that the fuel has a defined (initial) composition, estimating an emission value for the other type of radiation as a function of the assumed composition and the burn up fraction deduced for the fuel, comparing this estimated emission value with the measured value of the other radiation, and concluding that the assumed composition of the fuel is the real (initial) composition if the composed values are similar and that, if not, the fuel has another composition.

In the case principally considered, one of the types of radiation is neutron radiation and the other type of radiation is gamma radiation over an emission energy band of at least one long life radioactive element.

In fact, although the gamma radiation varies in the same manner for the two fuel compositions as a function of the burn up fraction, the neutron radiation is always higher for the mixed fuel as the burn up fraction increases. The measured neutron radiation can therefore be linked to very different burn up fractions depending on the composition of the fuel, which can be correlated to very different gamma radiation activities, one of which one can be linked to the gamma activity measured by the other sensor in order to deduce the composition. The contribution from short half-life radioactive elements must however be ruled out, which depends on the cooling time of the fuel and the last irradiation power, in other words completely different parameters.

The preferred device for carrying out these measurements and this process comprises, apart from the detectors of the two types of radiation and a casing that contains them, means for attaching the casing to a boom that descends towards the fuel, stored in storage cells in a water filled bay, and means for positioning the casing in a given position on at least one of the cells, adjoining the cell containing the fuel that will be inspected. Such a device may be placed in a precisely defined position on the fuel storage structure, without having to worry about an error in its positioning or an unexpected movement, after which the fuel only has to be extracted slightly from the adjoining cell to place it at the same height as the detectors and to be able to carry out the inspection. The device can then be transported to another fuel zone by moving the boom.

These aspects of the invention and others will now be described using the following figures:

FIGS. 3 and 4 show two enlarged longitudinal sections of the device

Figure 6:
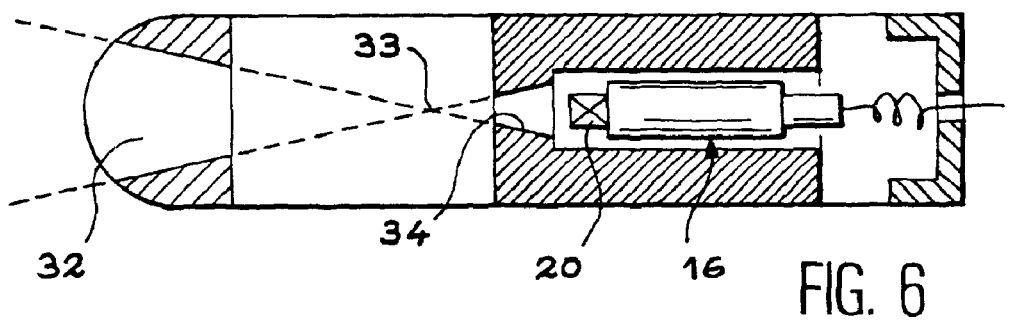
Figure 7:
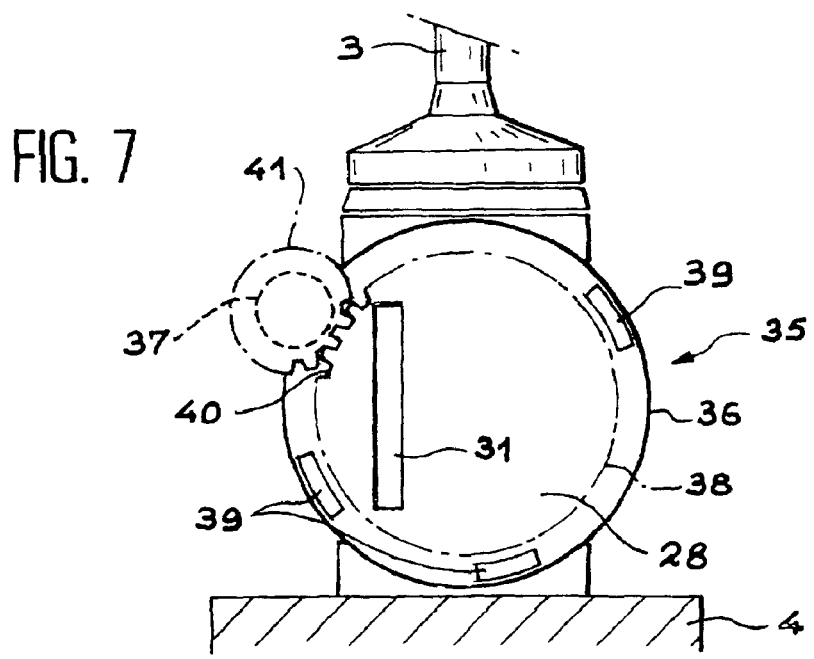

And FIGS. 6 and 7 illustrate two possible improvements to the device.

Figure 1:
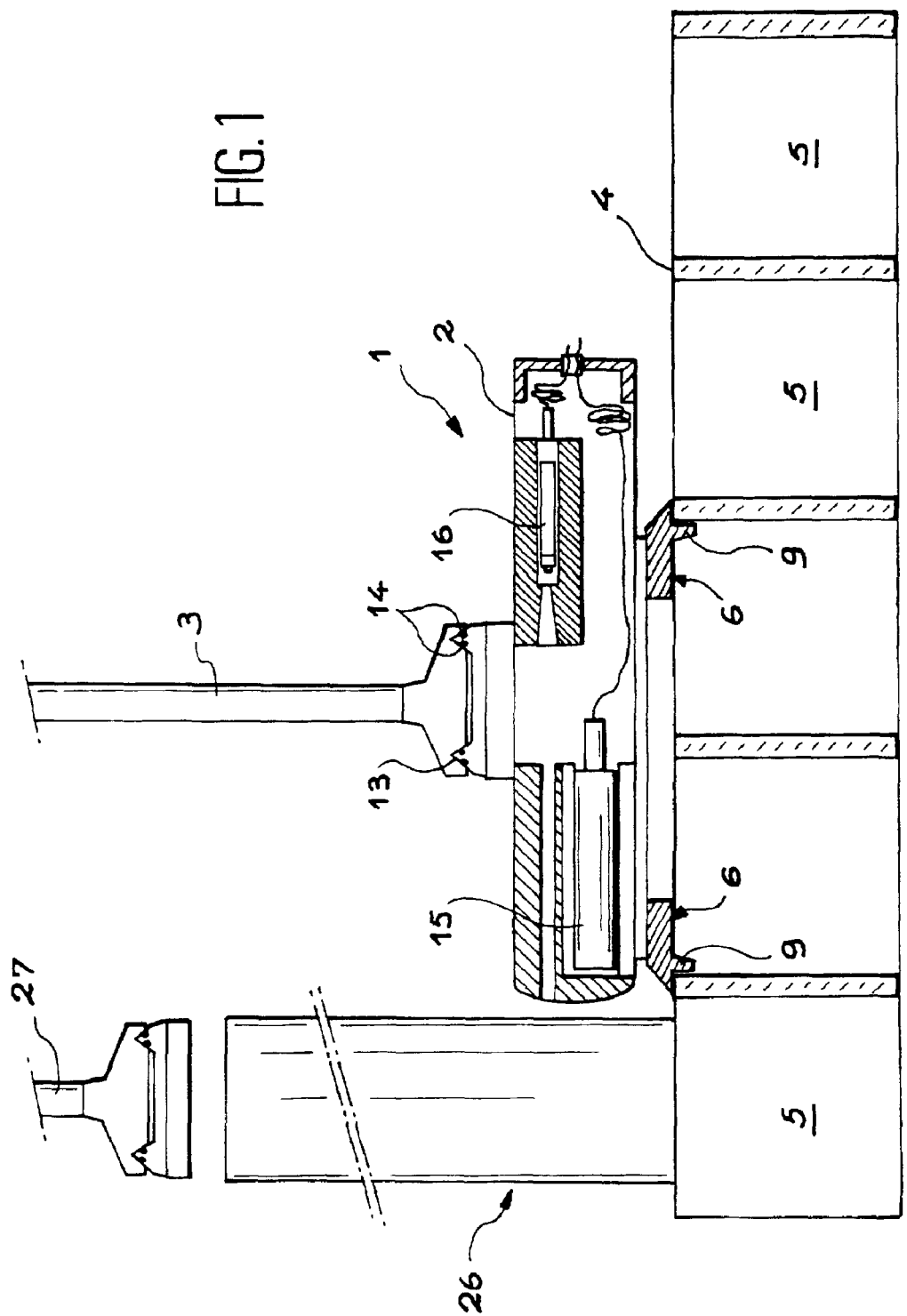
FIG. 1 shows a longitudinal section of the device in its environment
Figure 2:
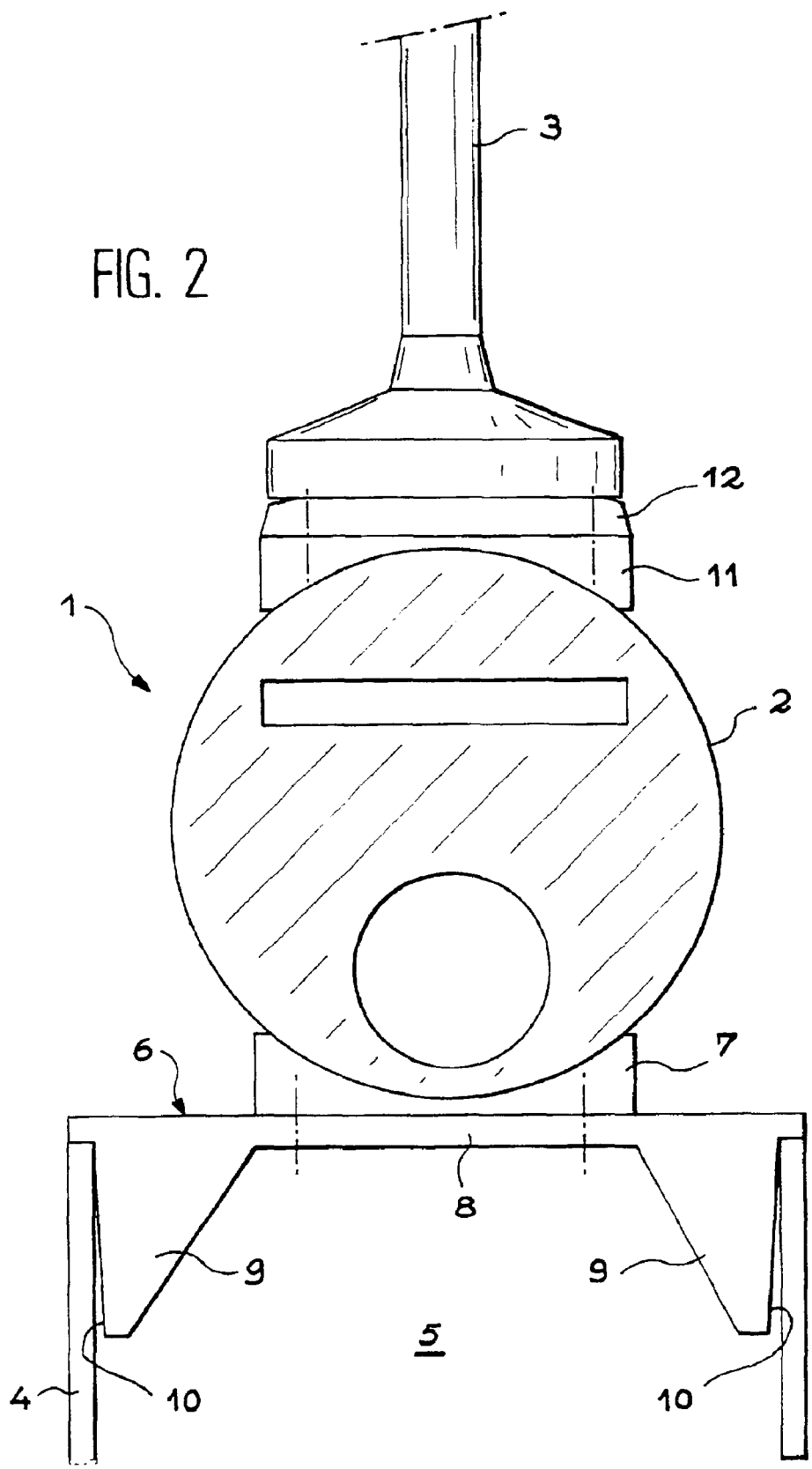
FIG. 2 shows a cross section of the device

Thus, as shown in FIG. 1, the device, bearing the reference 1, is immersed in a water filled storage bay for cooling the fuel; it comprises a casing, 2, with a generally cylindrical shape, suspended from a handling boom, 3, which belongs to a system that already exists in the installation and which can be moved horizontally and vertically. The device, 1, can thus be placed on a structure, 4, of square or hexagonal cells, 5, for storing the nuclear fuel. As can be seen also from FIG. 2, the system for placing the device, 1, on the structure, 4, comprises two tenons, 6, placed symmetrically to the front and rear of the casing, 1, and screwed to a communal base, 7, welded to the base of the casing, 2; the tenons, 6, comprise a plate, 8, and, laterally, two teeth, 9, that each have external edges, 10, which taper, and that each fit into a corner of the cell, 5, and penetrate into this cell; the external edges, turned towards the structure, 4, of the teeth, 9, have a clearance that allows them to be introduced without difficulty into the cells, 5, by lowering the boom, 3, then adjusting the position of the device, 1, when they touch the structure, 4.

An analogous set up can be used to ensure the attachment of the device, 1, to the boom, 3; a base, 11, is welded to the top of the casing, 2, and a gripping part, 12, is screwed into it; it has holds, 13, which grip onto the mobile catches, 14, of the boom, 3, which enable the device, 1, to be held firmly. It will have been understood that the gripping part, 12, and the tenons, 6, are screwed so that they can be replaced by parts with an analogous shape if the device, 1, has to be used with another boom, 3, or another structure, 4, on which it has to be set down.

The casing, 1, comprises (see also FIGS. 3 and 4) a neutron detector, 15, and a gamma radiation detector, 16, enclosed in the casing, 2. The neutron detector, 15, is composed of a fission chamber, 17, which converts the neutrons into electrical impulses, a thermalisation block, 18, which slows down the neutrons before allowing them to reach the fission chamber, 17, and which thus surrounds it, and an electrical connector, 19, joined to the fission chamber, 17. The gamma radiation detector, 16, comprises a narrow resolution crystal, 20, which signifies that it is only sensitive to photons with a well defined energy level. It can be a CdZnTe crystal, which is only sensitive to photons emitted by the isotopes of caesium (134 Cs, 137 Cs); the detector, 16, also comprises an electrical connector, 21, attached to the crystal, 20. The connectors, 19 and 21, transmit the electrical signals via the wire, 22, to a measuring unit, 41, located outside of the water filled storage bay, which evaluates the types of radiation captured and enables the radiation output from the fuel to be deduced, or even to automatically apply the process described later. These wires, 22, pass through a waterproof plug, 23, which seals off the rear of the casing, 2. A lead or tungsten alloy shield, 24, surrounds the rest of the gamma radiation detector, 16, and comprises a collimator opening, forming a rear collimator, 25. This opening is conoidal, in other words in the form of a cone with an elliptic base whose largest axis of ellipse extends out in a horizontal direction or in the direction of the width of an assembly, 26, of nuclear fuel rods to be examined by the device, 1; this assembly, 26, is shown in the position for examination, partially extracted from a cell, 5, adjoining those on which the device, 1, is held. A boom, 27, analogous to the boom, 3, is used to carry out this extraction.

The casing, 2, is covered in the front by a specially shaped lead shield, 28, due to the gamma radiation, which the assemblies, 26, generally emit at an intensity a lot higher than the other. It comprises a thin, continuous part, 29, and which is placed in front of the neutron detector, 15, and a thick part, 30, with a slot, 31, in it, forming a front collimator, in front of the gamma radiation detector, 16, which, as can be seen, is placed behind the neutron detector, 15, but at a higher level in order not to get in its way. Under these conditions, the thin part, 29, of the shield, 28, protects the neutron detector, 15, from the gamma photons and the slot, 31, which extends over the whole width of the fuel assembly, 26, but is very thin in the other direction, and only allows a slight amount of radiation to pass towards the gamma radiation detector, 16, which is therefore not saturated; and the neutron detector, 15, is protected from the photons arriving from the top of the assembly, 26, by the thick part, 30, which covers it. The purpose of the opening, 25, of the rear collimator is also to stop part of the radiation that reaches it, but must all the same have a sufficiently large opening area at the bottom so that the crystal, 20, is exposed to the radiation. The gamma radiation detector, 16, can slide by rubbing up against the casing, 2, which allows its axial position to be adjusted and to adjust the overall collimation. It can be guided by rails, which are not illustrated.

Figure 5:
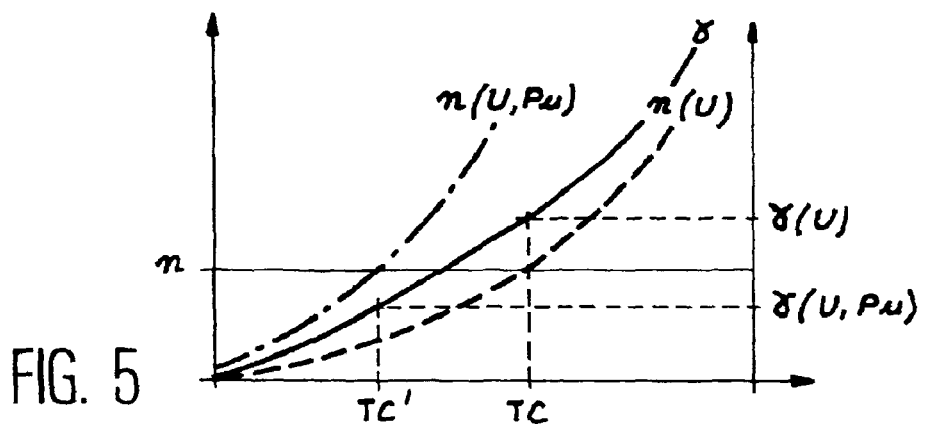
FIG. 5 shows an explanatory graph for the process

The device, 1, as shown in FIG. 1 is ready to operate, and by referring to FIG. 5, it will immediately be obvious how the measuring principle works; the number of neutrons captured by the detector, 15, is the number, n; the neutron activity curves for a uranium oxide assembly and an assembly containing a mixture of uranium and plutonium as a function burn up rate, or the irradiation of the assembly, are given in the curves n (U) and n (U, Pu). If one assumes that the fuel is pure uranium oxide, one deduces that the burn up fraction is TC; one then expect's to measure an activity γ (U) using a γ curve which gives the activity as a function of the burn up fraction (this curve is valid for the two fuel compositions). If the activity measured by the detector, 16, is similar to this value, the initial assumption is confirmed; the fuel is indeed pure uranium oxide. If not, it is a mixture of oxides. Obviously, one can carry out another verification and also estimate the burn up fraction, TC', for which the mixed fuel would give the measured neutron activity, n, then deduce from this the activity γ (U, Pu) that one should then obtain and check if this value corresponds to that which is in fact measured. It is obvious that this process can be applied to discriminating more than two nuclear fuel compositions if one so desires, and even if their gamma radiation curves are different. Two other possible improvements are given in FIGS. 6 and 7. If the gamma radiation captured by the detector, 16, has to be further reduced compared to the solution represented above, one can change the collimation system and replace the slit, 31, of the shield, 29, by a fan shaped slit, 32, which opens out towards the assembly, 26, of the fuel in the direction of its width (the vertical direction in FIG. 6). The height of the slit, 32, is identical to that of slit 31. The collimated radiation converges towards a focal point, 33, which can be located behind or in front of the gamma radiation detector, 16; the opening of the rear collimator, here given the reference 34, is at an identical angle to that of the front slot, 32, and if the rear collimator is located behind the focal point, 33, the opening, 34, opens up towards the crystal, 20. This construction makes it possible to reduce the quantity of radiation captured by the crystal, 20, while at the same time conserving the advantage that the slot, 34, opens out onto the whole surface of the crystal, 20, and the slot, 32, onto the whole width of the assembly, 26.

The process and the device, as explained up to now, are especially efficient for checking the whole of the assembly, 26, but one can envisage being faced with a substitution, which is more difficult to detect, of certain rods only in this assembly. A process that makes it possible to obtain an individual image of the fuel rods would consist in turning the device, 1, around the assembly, 26, stopping it at certain set places and taking measurements of the activity of the assembly, 26, at each of these emplacements, before calculating the contribution of each of the rods by applying an inversion calculation of a matrix system, taking account of the distance of the rods for each measurement. Tomographic processes of this nature are however regularly used, including in the nuclear field, to such an extent that it is not useful to detail examples.

Another manner of working could consist in dedicating the measurement to a single rod or to a small number of rods. One could then adopt the system shown in FIG. 7, where the casing, 2, is replaced by a composite casing, 35, composed of two concentric envelopes, an external envelope, 36, which is fitted with means for attaching it to the boom, 3, and placing it on the structure, 4, and a drive unit, 37, and an internal envelope, 38, fitted with detectors, 15 and 16, and the shield, 28. The envelopes, 36 and 38, could be mobile in relation to each other thanks to intermediate steps, 39, set out in two circles, near to the edges of the device, 1. The internal envelope, 38, could be fitted with a toothed crown, 40, which would mesh with an exit cogwheel, 41, of the drive unit, 37, so that the drive unit could turn the internal envelope, 38: one could then place the slot, 31 (or 32) vertically, in the direction of the extension of the fuel rods, in such a manner that the measured gamma radiation would only come from a single rod or a small number of rods located in the extension of the slot. The drive unit, 37, could be controlled from the outside, by a remote control or by wires, which are not shown. One could also envisage providing stop blocks to stop the movement of the internal envelope, 38, at a vertical position of the slot, 31, and at a horizontal position of the slot, 31, and thus to limit its movement to a quarter turn; a limitation of the movement to a half turn could also be envisaged, in order to place the slot, 31, at two different vertical positions without having to move the device, 1, which is possible since the slot, 31, does not pass by the centre of the casings 36 and 38.

What is claimed is:

1. A device for discriminating nuclear fuels in an installation comprising a sub-adjacent structure provided with storage cells immersed in a water filled bay, the device comprising a waterproof casing containing a first detector of a first radiation and a second detector of a second radiation, means for attaching the waterproof casing to a boom, and means, located at a bottom of the casing, for securing the casing on a first cell to allow the first detector and the second detector to discriminate nuclear fuel in a second adjacent cell, wherein the means for securing comprises lateral teeth that comprise external edges having a taper.

2. A device for discriminating nuclear fuels according to claim 1, whereby the second detector is a gamma radiation detector located behind two collimators in continuation, comprising a rear collimator, located just in front of the said second detector and opening up onto the whole detection area of a detection body, and a front collimator, with a slot section extended in a transversal direction of a fuel element, and the first detector is a neutron detector.

3. A device for discriminating nuclear fuels according to claim 2, whereby the casing comprises a fixed part bearing the means for attaching it, and a mobile part, that pivots around the fixed part in such a way as to turn the slot a quarter turn or a half turn.

4. A device for discriminating nuclear fuels according to claim 2, whereby the slot has a variable extension dimension and broadens out towards the fuel element.

5. A device for discriminating nuclear fuel in an installation comprising a sub-adjacent structure provided with storage cells immersed in a water filled bay, the device comprising a waterproof casing containing a first detector of a first radiation and a second detector of a second radiation, a shield of the second radiation, means for attaching the waterproof casing to a boom, and means, located at the base of the casing, for securing the casing on a first cell to allow the first detector and second detector to discriminate nuclear fuel in a second adjacent cell, and wherein the shield comprises a thinner part in front of the first detector and a thicker part in front of the second detector, the first detector is a neutron detector, the second detector is a gamma ray detector, the thicker part of the shield comprises a front colimator extending towards the second detector, the front colimator having a section which is elongated in a transversal direction of a fuel element, and the means located at the base of the casing to securely position comprises lateral teeth that comprise external edges having a taper.

6. A device according to claim 5, wherein the second detector is surrounded by a shield comprising a rear collimator which is a conoidal having a base with a largest axis extending out in the transversal direction of the rod.

7. A device according to claim 5, wherein the shield surrounding the second detector is slidably contained in the casing.

* * * * *

UNITED STATES PATENT AND TRADEMARK OFFICE
CERTIFICATE OF CORRECTION

PATENT NO. : 6,895,065 B1
DATED : May 17, 2005
INVENTOR(S) : Lebrun et al.

It is certified that error appears in the above-identified patent and that said Letters Patent is hereby corrected as shown below:

Column 6,
Lines 36 and 37, delete "colimator" and insert -- collimator --.

Signed and Sealed this

Tenth Day of January, 2006

JON W. DUDAS
*Director of the United States Patent and Trademark Office*